United States Patent Office 3,703,378
Patented Nov. 21, 1972

3,703,378
SNACK FOOD AND METHOD OF
PRODUCING SAME
Edward E. Bretch, Berwick, Pa., assignor to
Borden, Inc., New York, N.Y.
No Drawing. Continuation-in-part of application Ser. No. 676,716, Oct. 20, 1967. This application June 30, 1970, Ser. No. 51,369
Int. Cl. A23l 1/00, 1/10
U.S. Cl. 99—81                 15 Claims

ABSTRACT OF THE DISCLOSURE

Production of snack food products which expand upon baking or frying by heating a mix of a starch component and acylated high amylose starch as an expansion prevention agent to gelatinize the starch, cooling the mix to below gelatinization temperature and promptly thereafter shaping the mix into units of the shape desired.

REFERENCE TO RELATED APPLICATION

This application is a continuation-in-part of application Ser. No. 676,716 filed on Oct. 20, 1967, now abandoned.

BACKGROUND OF THE INVENTION

Heretofore, it has not been possible to prepare partially or completely gelatinized starch puff half-products and the corresponding fried or baked products by means of a continuous method. Long holding periods, i.e., eight to twenty-four hours, of the gelatinized paste prior to forming thereof as by extrusion, into units of the shape desired, were required. In addition, after such forming, extended drying times were required in order to prevent deformation of the units due to expansion before frying or baking.

Attempts to overcome these deficiencies have not been successful since long holding periods under pressure before extrusion and long drying periods after extrusion are still required. Illustrative of these practices is U.S. Pat. No. 3,150,978, wherein the starch paste partially or completely gelatinized, must be tempered, i.e., cooled while under pressure for a substantial period of time in order to prevent distortion of the paste after it has been extruded. Even after such extended mechanical treatment of the paste, it must still be dried very slowly over a long period of time, in order to prevent expansion of the paste during the drying before cooling. Thus, while deformation of the paste is to some extent abated, a commercially continuous process still is not available.

Lastly, the prior art cooked starch puff products are blistered and rough textured, an appearance which detracts from their commercial saleability.

SUMMARY OF THE INVENTION

It has now been found that partially or completely gelatinized starch puff half-products and the corresponding fried or baked products can be made continuously without long treatment times and, moreover, such products can be prepared having a smooth outer surface that is non-blistering even after expansion by frying or baking.

Briefly stated, the present invention comprises a partially or completely gelatinized starch puff half-product comprising a starch component and an edible expansion prevention agent, said starch component containing as its major constituent any conventional starch, said prevention agent being a high amylose starch, and the proportion of prevention agent to starch component being such that there is no expansion of the product until frying or baking. The invention also relates to the corresponding fried or baked products and to the method of making the products, as hereinafter described.

DETAILED DESCRIPTION

As to materials, the starch component can be a starch of any botanical origin, unmodified and modified by any chemical or physical modification. It can be selected from corn, tapioca, wheat, rice, potato and sorghum starches. Flours from the grains or tubers can be used. The preferred starch is any which has first been cross-linked with a polyfunctional etherification or esterification reagent followed by acylation, as with acetic or propionic anhydride. In this group of preferred starches, the modified waxy maize starches have performed admirably. Specific examples of such preferred starches are set forth in U.S. Pat. No. 2,935,510.

The edible expansion prevention agent is selected from high amylose starches, and more specifically, acylated high amylose corn starches. This can be any product resulting from fractionation of whole starch to obtain the predominantly amylose component that is acylated and includes acylated whole starches composed of at least about 50% by weight of amylose. It is preferred to use the high amylose corn starches which have been acylated as set forth in U.S. Pat. No. 2,461,139. Such starches set in less than 1 minute, and more specifically, in a matter of seconds.

The above noted starch and agent comprise the important and essential components of the product which must be present in the paste before it is partially or completely gelatinized, formed, dried, and fried or baked. Depending upon the flavoring of the product desired, other starch materials, such as potato flour and tapioca, can also be incorporated into the starch component.

In addition to the starch component and expansion prevention agent of the mix, flavor and coloring ingredients are also added, depending upon the final product desired. Thus, for example, onion powder, dried apple, fruit flavoring and coloring, chicken flavoring, bacon pieces, barbecue flavoring and the like can be incorporated into the mix in the amount required to give the desired flavoring. The types and amounts of coloring and flavoring ingredients will, of course, vary depending upon individual taste.

As to proportions, parts by weight of the starch component to the expansion prevention agent may vary from 3:1 to 1:3, with the preferred range being 3:2. Effectiveness of the expansion prevention agent is lost if more than 3 parts of the starch component is used per 1 part of the agent. On the other hand, the final fried product is too hard for human consumption if more than 3 parts of the expansion prevention agent is used for every part of the starch component.

The steps in the method of making the product are critical in order to have a continuous process and to obtain products having the smooth, non-blistering appearance required for saleability of the products. A paste is formed by mixing the dry ingredients with the water in a continuous mixer, as in a ribbon blender. The paste is one preferably of 65% solids, although 50% to 85% solids pastes can be used. The paste is then continuously forwarded into a vessel adapted so that the paste can be heated to gelatinize the starches as it passes therethrough to the discharge end of the vessel. A standard continuous cooker can be used for this purpose and the heating is ordinarily to a temperature of about 160 to 200° F. The partially or completely gelatinized paste, as it is removed from the cooker, is in the form of a continuous ribbon and is cooled to a temperature below that of gelatinization of the starch, i.e., below 160° F., preferably to a temperature below 100° F., although it can be held at the same temperature as the cooking temperature. This is best accomplished by simply forwarding the ribbon of paste to an extruder on a conveyor exposed to the atmosphere. The continuously moving ribbon is then placed into such that, as the ribbon an extrusion die of a configuration such that, as the ribbon is passed therethrough, it will impart the desired shape to the ribbon as it is being extruded. As the partially or completely gelatinized paste is extruded, it is cut into the size desired.

Alternatively, extrusion may be eliminated and the product die-cut into the shape desired after it has been gelatinized and cooled simply by forming the paste into sheets of desired thickness.

The shaped partially or completely gelatinized paste is then dried to a moisture content in the range of from 5% to 15% and preferably, from about 8% to about 12%. This can be accomplished by the use of ovens or by air drying. The drying is carried out in such a manner so as to avoid evaporation of water from the product since in preparing puffed products it is known that rapid removal of water by the use of high temperatures lessens the ability of the product to puff when fried or baked. However, drying temperatures of up to 185° F. can be used resulting in rapid drying without expansion of the half-product.

In the preferred embodiment, the drying is carried out in two stages wherein after initial drying under atmospheric conditions or in an oven to a moisture content of 12% to 15%, the product is dried to a moisture content of about 8–10% by being placed into revolving pans and hot air blown thereover. This acts to case-harden the exterior of the product by rapid removal of moisture from the outermost layers of the product and is preferably carried out just prior to frying or baking of the product. Also, the second stage of case-hardening can be accomplished in drying ovens, just before frying.

The case-hardening gives a smooth exterior surface to the product since it enables the drying air to be passed uniformly over all the surfaces of the product. In addition, and most importantly, case-hardening limits the amount of oil absorbed by the product if it is to be fried. The products of the instant invention can absorb as little as 10% oil, something not possible with existing starch-puff products.

The half-product at this stage is suitable for shipment in commerce since it is hard enough to withstand the severe agitation incurred in shipment of goods without breaking or crumbling. This is a significant economic advantage since these products, which require only frying or baking to be consumed, may be made in one central location and shipped great distances to be fried or baked, thus insuring a fresher product to the consumer and eliminating the need for many processing plants.

As noted, the half-product is puffed or cooked either by being baked or being placed in a fryer in the usual manner for puffing. After cooking, it is preferred for many products that additional seasoning be placed on the exterior of the product by tumbling the product with the seasoning desired as is conventionally done with other snack foods. The product is then packaged.

The invention disclosed and claimed herein will be further described in connection with the following examples which are set forth for purposes of illustration only.

EXAMPLE 1

A ring shaped onion flavored starch puff half-product was made from the following formula:

| | Percent by weight |
|---|---|
| Cross-linked modified waxy maize starch [1] | 35.55 |
| Tapioca starch | 31.12 |
| Acylated high amylose starch [2] | 22.22 |
| Potato flour | 4.44 |
| Coconut oil | 4.44 |
| Onion powder | 2.22 |
| Color 5166 [3] | .01 |
| | 100.00 |

[1] Col Flo 67, available from National Starch and Chemical Corp.
[2] Crisp Film, available from National Starch and Chemical Corp.
[3] Is available from Warner-Jenkinson Mfg. Co. and has the following composition:
Color No. 5166 Brown Shade (a finely ground, water-soluble brown powder):

| | Parts |
|---|---|
| FD&C Red No. 2 | 27.0 |
| FD&C Yellow No. 5 | 64.5 |
| FD&C Yellow No. 6 | 5.0 |
| FD&C Blue No. 1 | 3.5 |
| | 100.00 |

The components of the formula were admixed in water to give a 65% solid aqueous paste. The paste was heated in a continuous cooker to gelatinize the starch and, as removed from the cooker (in the form of a ribbon), was placed onto a cooling conveyor and carried directly into an extruder. The moisture content of the paste, as it left the cooker, was 25%.

The extruder extruded the gelled paste at a head plate in the form of a tube. Slicing means located at the extruder plate immediately cut the tube into individual rings about 0.075 inch thick. The rings were then conveyed through a drying oven maintained at a temperature of 184° F. where the moisture was lowered to 15% $H_2O$ in about 51 minutes.

The partially dried product was then further dried by hot air passed thereover in a revolving pan or drying oven to a moisture content of 8% and the product fried in cottonseed oil at a temperature of 360° F. After the frying the rings were tumbled with additional seasoning so that the final puffed product had the following formula:

| | Percent by weight |
|---|---|
| Col Flo | 27.36 |
| Tapioca starch | 23.94 |
| Crisp Film | 17.10 |
| Cottonseed oil | 11.64 |
| Onion seasoning | 10.50 |
| Potato flour | 3.42 |
| Coconut oil | 3.42 |
| Onion powder | 1.71 |
| Water | .90 |
| Color 5166 | .01 |
| | 100.00 |

EXAMPLE 2

The identical formula and process was used as set forth in Example 1, except that the rings, when formed from the extruder, were just dried to a moisture content of 12.5% in the drying oven and then stored.

There was no expansion of the product after extrusion, drying, or upon storing and the half-products when fried after storage, were identical in appearance and taste to the straight-through products produced in Example 1.

EXAMPLE 3

An apple chip product was made in a continuous manner utilizing the same process as set forth in Example 1 with the exception that the extruder die was one which extruded a solid rod of paste which was then cut into chips from .06–.1 inch thick. The formula of product before the water was added was:

| | |
|---|---|
| Col Flo 67 | 32 |
| Tapicoa starch | 28 |
| Crisp Film | 20 |
| Dehydrated apple | 20 |
| | 100 |

After frying, the product was coated in a tumbler with cinnamon and dehydrated apple for additional flavoring.

EXAMPLE 4

A chicken chip product was made in a continuous manner utilizing the same process as set forth in Example 3. The formula of the product before the water was added was:

| | |
|---|---|
| Col Flo 67 | 33.34 |
| Tapioca starch | 29.16 |
| Crisp Film | 20.83 |
| Chicken concentrate | 16.67 |
| | 100.00 |

After frying, the product was ready to be consumed.

It will be understood that it is intended to cover all changes and modifications of the examples of the invention herein chosen for the purpose of illustration which do not constitute departures from the spirit and scope of the invention.

What is claimed is:

1. A starch puff half-product containing no more than 15% moisture which is puffable upon frying or baking comprising a starch component and expansion preventation agent, said starch component being a cross-linked acylated waxy maize starch and said expansion preventation agent being an acylated high amylose corn starch containing at least 50% by weight of amylose, the ratio in parts by weight of said starch component to said expansion preventation agent being from about 3 to 1 to about 1 to 3.

2. The product of claim 1 in which the agent is methylated high amylose corn starch, the ratio of said starch component to said agent being 3 to 2.

3. A method of making a starch puff half-product which is substantially non-expanding until fried or baked comprising the steps of forming an aqueous paste of from about 50% to about 85% solids comprising a starch component and a high amylose starch containing at least 50% by weight of amylose, heating the paste for a time sufficient to gelatinize the paste, shaping the paste into units of the shape desired, and drying said units to a moisture content of 5% to 15%, the ratio, in parts by weight, of starch component to high amylose starch being from about 1 to 3 to about 3 to 1.

4. The method of claim 3 wherein said starch component is cross-linked acylated waxy maize starch and said agent is acylated high amylose corn starch.

5. The method of claim 4 wherein the ratio of said starch component to said agent is 3 to 2.

6. The method of claim 3 wherein the drying is accomplished by first drying the units to a moisture content of between about 12% to about 15% followed by drying the units to an average moisture content between about 8% to about 10% by passing hot air thereover while the units are maintained in an agitated state or in a drying oven, the exterior portion of said units being of a lower moisture content than the interior portion.

7. The method of claim 6 wherein shaping is accomplished by extrusion and drying is carried out at a temperature of up to 185° F.

8. A method of preparing a starch puff half-product which is substantially non-expanding until fried or baked comprising the steps of gelatinizing by application of heat an aqueous paste containing 50–85% solids comprising a starch component and a high amylose starch containing at least 50% by weight amylose; and drying the paste to a moisture content of 5% to 15%; the ratio, in parts by weight, of said starch component to said high amylose starch being from about 3:1 to about 1:3.

9. The method of claim 8 wherein said starch component is cross-linked and acylated waxy maize starch, said high amylose starch is acylated high amylose corn starch, the step of gelatinizing is effected at a temperature of 160° F. to 200° F., the step of cooling is effected at a temperature of below 160° F. and step of drying is effected at a temperature of up to 185° F.

10. The method of claim 9 which further includes the steps of forming the paste into a ribbon prior to said cooling step and shaping the ribbon into separate units following said cooling step.

11. The method of claim 10 wherein said step of drying is effected by drying the separate units in two stages: in the first stage the moisture content of the separate units is reduced to between about 12% and 15%, while in the second stage, the moisture content of the separate units is reduced to between about 8% to 10% by blowing hot air against the separate units or by use of a drying oven which results in case-hardening thereof.

12. The method of claim 11 wherein the ratio of starch component to high amylose starch is 3 to 2.

13. A continuous method of making a starch puff half-product which is substantially non-expanding until fried or baked comprising the steps of continuously forming an aqueous paste of from 50% to 85% solids comprising a starch component and a high amylose starch containing at least 50% by weight of amylose, continuously heating the paste for a time sufficient to gelatinize the paste, forming the paste into a continuous ribbon, shaping the ribbon into units of the shape desired and drying said units at a temperature of up to 185° F. to a moisture content of 5% to 15%, the ratio, in parts by weight, of starch component to high amylose starch being from 3 to 1 to 1 to 3.

14. The method of claim 13 wherein said starch component is cross-linked and acylated waxy maize starch, said high amylose starch is acylated high amylose corn starch and said heating step is conducted at a temperature in the range of 160° F. to 200° F.

15. The method of claim 14 wherein the drying is accomplished by first drying the units to a moisture content of between about 12% to about 15% followed by drying the units to an average moisture content between about 8% and about 10% by passing hot air thereover while the units are maintained in an agitated state or by use of a drying oven, the exterior portion of said units being of a lower moisture content than the interior portion.

References Cited

UNITED STATES PATENTS

| | | | |
|---|---|---|---|
| 3,150,978 | 9/1964 | Campfield | 99—1 |
| 3,282,701 | 11/1966 | Wong et al. | 99—1 |
| 3,372,034 | 3/1968 | Magic et al. | 99—83 |

RAYMOND N. JONES, Primary Examiner

U.S. Cl. X.R.

99—81